Oct. 3, 1961 A. H. FAULKNER 3,003,034
TONE CONTROLLED PAYSTATION
Filed Feb. 7, 1956
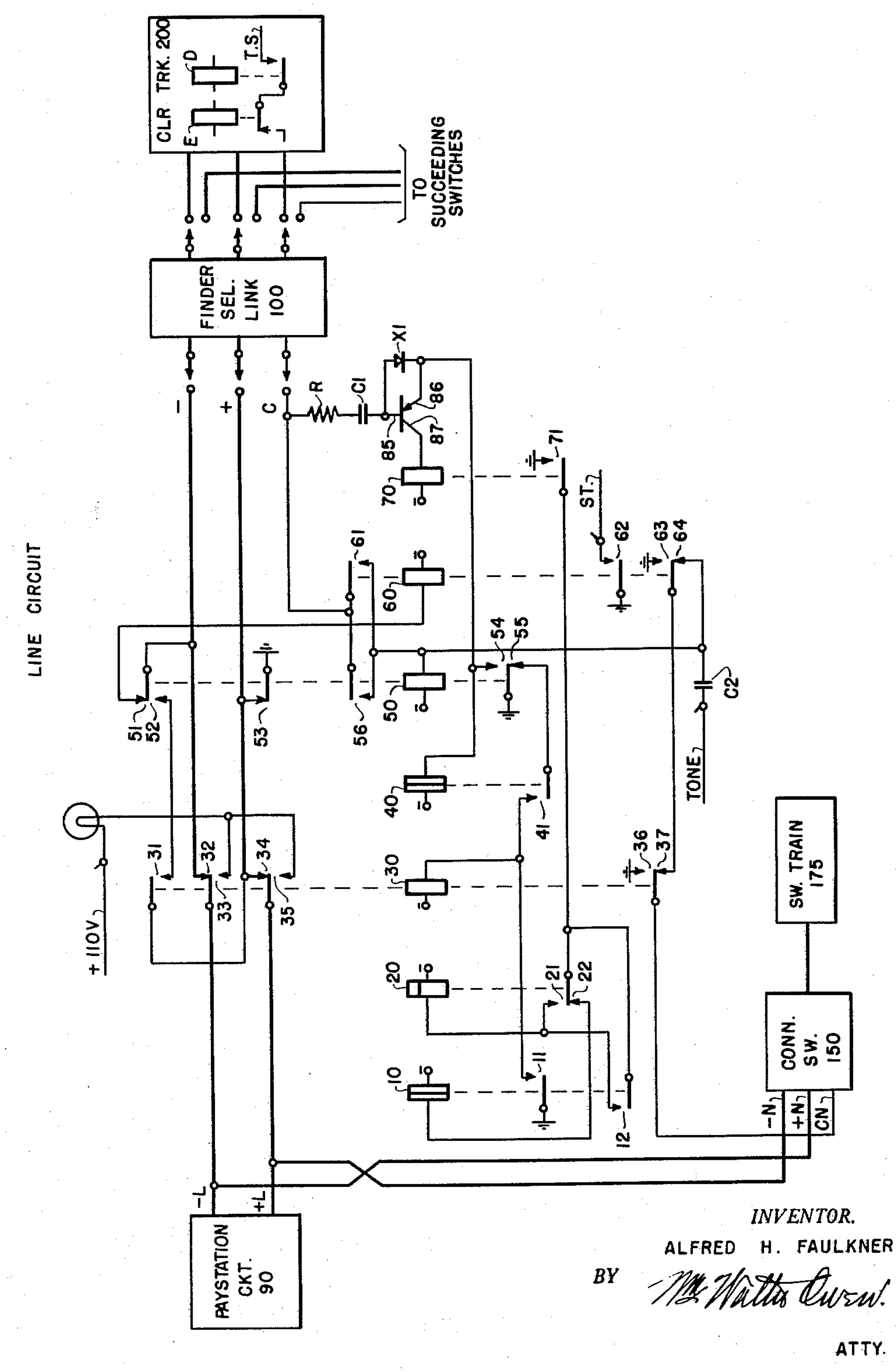
INVENTOR.
ALFRED H. FAULKNER
BY Wm. Walter Owen
ATTY.

United States Patent Office 3,003,034

Patented Oct. 3, 1961

3,003,034
TONE CONTROLLED PAYSTATION

Alfred H. Faulkner, Chicago, Ill., assignor to Automatic Electric Laboratories, Inc., a corporation of Delaware Filed Feb. 7, 1956, Ser. No. 563,925
5 Claims. (Cl. 179—6.3)

This invention relates generally to apparatus necessary for controlling a paystation of the type having coin apparatus controlling circuits in its associated line circuit and more specifically relates to an arrangement for providing a coin refunding operation at a prepay postpay paystation on a call to a toll operator.

As explained in the U.S. Patent 2,921,980, issue January 19, 1960, to C. E. Lomax, utilizing apparatus of the type described in the U.S. Patent 2,905,763, issued September 22, 1959, to Hans Sengebusch, a prepay paystation can be arranged to function as a postpay paystation for toll purposes to thereby eliminate certain problems in collecting a deposited heavy coin load. The aforementioned Sengebusch application describes a mechanism for accomplishing the above result, while the aforementioned Lomax application describes a circuit arrangement designed to function therewith. The Lomax application disclosed certain circuits in the common central office equipment for controlling the mechanism at the paystation from the common equipment. This is an excellent arrangement where a large number of such paystations are to be accommodated. However, if only a few paystations are provided in the system, a more economical arrangement has been to equip the line circuits of the paystations with the necessary control apparatus. Standard central office equipment is then modified to the extent of providing an extra control conductor and wiper on each finder and selector switch. Deposit of a coin at the calling paystation and dialling of the toll operator's digit raises the appropriate selector switch in the office to the combined line and recording (hereinafter referred to as CLR) trunk level for the purpose of extending a toll call. Ground is then returned over the extra conductor and wiper of the switches to the calling paystation line circuit to set the equipment thereat to perform the necessary control functions such as refunding the initial coin deposit made at the paystation.

The present invention eliminates the need for the additional conductors and wipers by enabling the equipment at the line circuit to be set by a tone returned over the conventional C lead, when a toll call is extended from a paystation.

The drawing discloses the circuit arrangement which is utilized for providing the proper control of the paystation apparatus described in the aforementioned Sengebusch application and illustrates the central office and paystation circuits which are to function therewith by means of block diagrams.

The present invention functions with the well-known Strowger type step-by-step finder and selector switches or with many other types of well-known switching equipment. A tone of higher voltage than the usual paystation class of service tone forwarded over the C lead for identifying a calling paystation to an operator, is returned over the C lead, when the selector switch connects to a CLR trunk. The higher voltage tone is returned for a time interval from the CLR trunk, after the CLR trunk is seized, as is illustrated diagrammatically by relays E and D in the CLR trunk 200. Any well-known type of CLR trunk may be modified to operate in the desired manner by providing make contacts on the line relay, which corresponds to relay D. It operates on seizure to return the comparatively high voltage tone over break contacts of relay E and the C lead. Relay E is a jack relay operated on answer by the operator to remove the comparatively high voltage tone from the C lead.

A call is initiated from the paystation by a party removing the handset at the calling station to operate the line circuit line relay 60. Relay 60 initiates operation of any well-known type of allotter over a start lead ST to cause a finder-selector link 100 comprising a finder switch and a selector switch to hunt for and connect with the calling line. Dial tone is returned to the calling party, and he initiates dialling after first depositing the proper coin value to remove the shunt around the dial springs at the paystation circuit 90 as described in the aforementioned Lomax application. If the call is a local call the selector switch is stepped to a level where it seizes an idle connector switch, which is then operated responsive to the dialling of the remaining called subscriber's digits to signal the called party. The connector switch is also of the well-known Strowger type step-by-step switch, although many other types can be used with the invention. Answer by the called party results in the reversal of battery on the line conductors to operate the collect relay (not shown) at the paystation in a manner described in the Lomax application. The collect relay operates to control apparatus at the paystation in a manner described in the Sengebusch application for collecting a deposited coin and places the paystation in a postpay condition. On termination of the call the switches restore, and on release of the finder switch ground is removed from the C lead to restore relay 50. It restores to operate relay 30 for applying refund potential to operate the refund relay (not shown) at the paystation in a manner described by the Lomax application. The refund relay operates to restore the apparatus at the paystation as described in the aforementioned Sengebusch application and the paystation is again arranged as a prepay paystation.

On toll calls the selector is stepped to the 0 level where it searches for and switches through to an idle CLR trunk such as 200. The line relay D completes a circuit for returning a comparatively high voltage tone over the C lead as already explained. The transistor TR1 connected to the C lead in the paystation line circuit amplifies the returned higher voltage tone sufficiently to operate relay 70, whereas the class of service tone is too weak even when amplified by TR1 to operate relay 70 and is therefore ineffective to control any equipment at the paystation line circuit. Relay 70 in turn operates relay 10 which controls relay 30 to return refund potential to paystation circuit 90 to operate the refund relay thereat for refunding a deposited coin.

The operator on answering causes battery from the CLR trunk to be reversed on the line conductors in any well-known manner, whereby the collect relay at the paystation is operated to throw the paystation into the postpay condition. The jack relay E operated on answer by the operator cuts off the comparatively high voltage tone from the C lead. The operator may now converse with the calling party and on receiving the paystation class of service tone forwarded over the C lead she requests and secures the proper coin deposit. The deposited coin or coins fall directly into the coin hopper without necessitating a collect operation, and the operator completes the call. On release of the call the switches are restored to remove ground from the C lead so that the line circuit returns 110 volt potential to the paystation for returning it to its prepay condition.

On calls to the paystation a connector switch 150 of any well-known type completes the connection from the switch train 175 extending from either a subscriber or an operator's position. The normals —N and +N from the connector bank contacts are arranged to forward battery from the connector to the paystation circuit in a reverse direction from that normally done. Battery being supplied in a reverse direction causes the collect relay to be operated and the paystation is thrown into the postpay condition. Ground forwarded over the CN lead results in the operation of relay 50. If the call was a reverse charge call from a toll operator, she requests the deposit of the proper coin value before completing the connection. As the station is in the postpay position, the deposited coins are collected merely by virtue of their deposit. Restoration of the connector switch restores relay 50 to cause relay 30 to return refund potential to the paystation to place it in a prepay condition.

In detail, a subscriber initiating a call from a prepay postpay paystation lifts his handset to complete the loop circuit including a paystation circuit such as 90, the −L conductor, contacts 32, 51 to battery through relay 60 and the +L conductor and contacts 34 to ground at contacts 53. Relay 60 operates to close contacts 62 for the purpose of initiating an allotter operation, which in turn causes an idle finder-selector link to hunt for and connect with the calling line in any well-known manner. At contacts 63, ground is returned over contacts 37, to the CN conductor to busy the line to any incoming calls. At contact 61, a circuit is prepared to return ground from the C lead when the finder-selector link connects with the calling line to operate relay 50 and to forward the class of service tone through condenser C2 over the C lead. The amplifying circuit including the transistor TR1 is arranged to provide insufficient amplification of this tone so that relay 70 remains unoperated. This class of service tone that is forwarded over condenser C2 to the C lead is later made available to an operator in any well-known manner on a toll call for enabling her to identify the call as originating from the paystation. Relay 50 on operating initially closes contacts 56 to complete its own holding circuit from ground on the C lead. Contacts 56 close first to ensure that the holding circuit of relay 50 is closed before relay 60 is restored. Contacts 51 and 53 open to restore relay 60. The closing of contacts 54 completes the circuit for operating slow-to-release relay 40. Slow-to-release relay 40 closes contacts 41 to prepare a circuit to relay 30. Ground is returned to the CN lead for maintaining the line circuit busy after contacts 63 open and contacts 61 close, from ground on the C lead through contacts 56 and contacts 64.

The calling subscriber receives dial tone in the usual manner subsequent to the finder-selector link connecting with the calling line. He is prevented from dialling by the shunt around his dial springs as described in the aforementioned Lomax application. By the initial deposit of the proper coin value, he removes the shunt and may proceed to dial.

On a call to a local subscriber, the selector is stepped to the proper level where it seizes a succeeding switch. The connection is completed to the called party's line in any well-known manner responsive to the dialling of the succeeding digits of the called party's number and the called party is thereafter signalled. On answer by the called party, battery is reversed on the line conductors to operate the collect relay (not shown) at the calling paystation. The collect relay operates to collect the deposited coin and the paystation remains in the postpay condition.

On termination of the call, the switches are restored, and when the finder switch is released, ground is removed from the C lead to deenergize relay 50. Relay 50 restores its operated contacts. Relay 40 being slow-to-release enables a circuit to be completed over contacts 55 and 41 to relay 30 which operates to close contacts 31, 33, 35, and 36, and open contacts 32, 34, and 37. Contacts 33 and 35 being closed, the +110 volt refund potential is returned over the −L and +L leads to operate the refund relay (not shown) at the paystation. The refund relay operates to restore the paystation to the prepay condition. Contacts 36 in the meantime maintain the CN lead grounded to maintain the circuit busy to incoming calls as ground on the C lead was removed on restoration of the finder switch. When relay 40 restores, it opens the circuit to relay 30 at contacts 41 to restore relay 30. Relay 30 on restoration restores its operated contacts to normal.

If the call was terminated before answer by the called party, the relay 50 restores to operate relay 30 as described and the high voltage potential is applied to the calling station to operate the refund relay thereat. As a coin is now on deposit the refund relay on operating causes it to be refunded.

On a call to a toll operator, the calling party dials 0 to step the selector to the CLR trunk level. After searching for and finding an idle CLR trunk such as 200 in a well known manner the selector switches-through to connect with the CLR trunk. Relay D in the CLR trunk is operated in any well-known manner, whereby the comparatively high voltage tone signal is returned over the C lead. On the negative half cycles of the high voltage tone, the base circuit 85 of transistor TR1 swings negative causing current to flow in the emitter circuit 86, it being properly biased by ground at contacts 54. Considerable current then flows in the collector circuit 87 to operate relay 70. On the positive half cycles the base swings positive to terminate current flow through the transistor, while the blocking condenser C1 discharges through rectifier X1 so that the succeeding negative half cycle may be amplified. Condenser C1 may be used to discriminate between the class of service tone and the returned tone, if they are of sufficiently different frequency. The relay 70 is operated when the collector circuit draws current and remains operated during the remainder of the time that the high voltage tone is applied to the C lead, as it cannot follow the rapid changes in current. Condenser C1 serves to block the D.C. potential normally on the C lead from the transistor, while resistor R helps prevent surges in current resulting from the completion of a circuit over the C lead from influencing the transistor.

Relay 70 closes contacts 71 to complete a circuit over contacts 22 to slow-to-release relay 10. Relay 10 operates to close contacts 12 thereby completing a circuit from contacts 71 to slow-to-operate relay 20, which completes its own holding circuit over contacts 71 and 21 while opening the circuit to relay 10 at contacts 22. Relay 10 also closed contacts 11 before relay 20 operated to complete the circuit to relay 30 which returns the high voltage refund potential to the calling paystation. Relay 30 also maintains a loop to the line relay (not shown) in the CLR trunk from the + lead, over contacts 31 and 52 and the − lead. Relay 10 restores after a period of time to restore relay 30 by opening contacts 11. Relay 70 is restored by the cessation of the high voltage tone on the C lead. It opens contacts 71 to restore relay 20. The class of service tone provided over condenser C2 and contacts 56 to the C lead enables the operator at the CLR trunk to identify the calling station as a paystation when she answers.

The operator on answering reverses battery on the loop to the calling party to operate the collect relay at the calling paystation thereby placing it in a postpay condition. The jack relay E is also operated as explained to cut off the comparatively high voltage tone from the C lead. The operator identifies the paystation by the class of service tone, and after conversing with the calling party she requests the deposit of the proper coin value and completes the connection. On termination of the call relay 50 is restored to operate 30 as previously described, and it restores after relay 40 restores. The operation of relay 30, of course, returns high voltage refund potential to the paystation to operate the refund relay thereat. The operated refund relay returns the paystation to the prepay condition as previously described.

An incoming call to the paystation from a regular subscriber or from a toll operator proceeds over the switch train 175 and connector switch 150. On finding battery over the CN lead, contacts 37 and 64 through relay 50 the connector switch forwards ground to operate relay 50. The paystation is now arranged in a postpay condition. Ringing current sent over normals in any well-known manner operates the ringer at the called station to signal the subscriber thereat. If this is a reverse charge call from a toll operator, she requests the deposit of the proper coin value on answer by the called party. The collect relay at the called station is operated immediately on answer as battery and ground are furnished to the +N and −N conductors in a direction to operate the collect relay. Due to the postpay condition of the substation on operation of the collect relay, deposited coins are collected on deposit and without performing any further collect operation. In the meantime ground from the connector switch forwarded over the CN lead, through contacts 37 and 64 operates relay 50, which in turn operates relay 40. Operation of relay 50 prevents a loop being completed to relay 60 when the called party answers by opening contacts 51 and 53. On termination of the call the connector switch restores to remove ground from the CN lead which in turn restores relay 50. Relay 50 on restoring operates relay 30 as previously described and opens the circuit to relay 40 so that it restores after a period of time. Relay 30 sends refund potential to the called paystation for the purpose of restoring it to the prepay condition. It restores when relay 40 is completely restored as previously described.

Thus having described my invention, but realizing it is capable of broader use than the particular embodiment shown, I wish the area of my invention to be circumscribed by the appended claims.

What is claimed is:

1. In a telephone system, a line having a paystation thereon, a line circuit individual to said line, a toll trunk circuit, switching means for extending a connection from said line circuit to said toll trunk circuit in response to the initiation of a call by said paystation, a special signal tone source in said toll trunk circuit, means in said toll trunk circuit operated in response to the extension of said connection thereto for applying said special signal tone to said connection, a source of paystation control potential in said line circuit, tone responding means individual to said line circuit operated in response to receipt of said special signal tone, and means in said line circuit operated in response to said operation of said tone responding means for applying said paystation control potential to said connection to initiate a coin control operation at said paystation.

2. In a telephone system, a paystation, a line circuit individual to said paystation, switching means having access thereto for extending desired calling connections, a toll trunk circuit accessible by said switching means, means in said line circuit operated in response to the initiation of a call by said paystation for initiating the operation of said switching means to hunt for and connect with said line circuit, said switching means thereafter operated under control of said paystation for extending said connection from said paystation to said toll trunk circuit to seize said trunk circuit, a special signal tone source in said trunk circuit, means in said trunk circuit operated in response to said seizure for applying said special signal tone to said connection, a source of paystation control potential in said line circuit, tone responding means individual to said line circuit operated in response to receipt of said special signal tone, and means in said line circuit operated in response to said operation of said tone responding means for applying said control potential to said connection to initiate a coin control operation at said paystation.

3. In a telephone system, a line having a paystation thereon, a line circuit individual to said line, a toll trunk circuit, switching means for extending a connection from said line circuit to said toll trunk circuit in response to the initiation of a call by said paystation, said connection including a pair of talking conductors extending from said paystation line through said line circuit to said toll trunk circuit and a control conductor extending from said line circuit to said toll trunk circuit, a special signal tone source in said toll trunk circuit, means in said toll trunk circuit operated over the portion of said connection comprising said pair of talking conductors for applying said special signal tone to said control conductor portion of said connection, a source of paystation control potential in said line circuit, tone responding means individual to said line circuit arranged to operate over said control conductor only in response to receipt of said special signal tone, relay means in said line circuit operated in response to said operation of said tone responding means, and means operated by said operation of said relay means for applying said paystation control potential to said pair of talking conductors of said connection extending to said paystation line for initiating a coin control operation at said paystation.

4. A telephone system such as claimed in claim 3, wherein said tone responding means comprises a transistor having its base circuit connected to said control conductor and its collector circuit connected to said relay means.

5. A telephone system such as claimed in claim 3, including a source of class tone in said line circuit, and means in said line circuit operated in response to said initiation of said call by said paystation for connecting said class tone source to said control conductor of said extended connection, said connection of said class tone effective over the said control conductor of said connection extended to said toll trunk circuit for indicating that said initiated call originated at said paystation and ineffective over the said control conductor at said line circuit for operating said tone responding means thereat.

References Cited in the file of this patent

UNITED STATES PATENTS

| | | |
|---|---|---|
| 1,480,206 | Hoffmann | Jan. 8, 1924 |
| 2,672,513 | Lomax | Mar. 16, 1954 |
| 2,729,703 | Faulkner et al. | Jan. 3, 1956 |
| 2,782,259 | Dimond | Feb. 19, 1956 |